US009237037B2

(12) United States Patent
Reams

(10) Patent No.: US 9,237,037 B2
(45) Date of Patent: Jan. 12, 2016

(54) METHODS, SYSTEMS AND COMPUTER PROGRAM PRODUCTS FOR ENABLING EMERGENCY 911 CALLS IN VOICE OVER INTERNET PROTOCOL (VOIP) SYSTEMS

(75) Inventor: Orin Reams, Newnan, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2297 days.

(21) Appl. No.: 11/548,374

(22) Filed: Oct. 11, 2006

(65) Prior Publication Data

US 2008/0089316 A1    Apr. 17, 2008

(51) Int. Cl.
*H04L 12/66* (2006.01)
*H04M 7/00* (2006.01)

(52) U.S. Cl.
CPC ............. *H04L 12/66* (2013.01); *H04M 7/0057* (2013.01); *H04M 2242/04* (2013.01)

(58) Field of Classification Search
CPC . H04L 12/66; H04M 2242/04; H04M 7/0057
USPC .......................... 370/352; 379/45, 220.01, 37
See application file for complete search history.

(56) References Cited

U.S. PATENT DOCUMENTS

| | | | | |
|---|---|---|---|---|
| 7,508,754 | B1* | 3/2009 | Sankaranaraynan ... | H04M 3/12 370/216 |
| 2005/0249196 | A1* | 11/2005 | Ansari et al. .................. | 370/352 |
| 2006/0140382 | A1* | 6/2006 | Huey ........................ | 379/220.01 |
| 2006/0188073 | A1* | 8/2006 | Wright ............................ | 379/45 |
| 2006/0193447 | A1* | 8/2006 | Schwartz ............ | H04M 1/2535 379/45 |
| 2006/0274729 | A1* | 12/2006 | Self .................... | H04L 29/06027 370/352 |
| 2006/0293024 | A1* | 12/2006 | Benco et al. ............... | 455/404.2 |
| 2007/0032225 | A1* | 2/2007 | Konicek et al. ............... | 455/417 |
| 2007/0036147 | A1* | 2/2007 | Nejah ................. | H04M 7/0069 370/352 |
| 2007/0058615 | A1* | 3/2007 | Hasenfang ............ | H04M 11/04 370/352 |
| 2007/0177582 | A1* | 8/2007 | Croak ................. | H04M 3/4228 370/352 |
| 2007/0189467 | A1* | 8/2007 | Croak ............... | H04L 29/06027 379/37 |
| 2008/0026728 | A1* | 1/2008 | Snapp et al. ................ | 455/414.1 |
| 2008/0207202 | A1* | 8/2008 | Zellner et al. .............. | 455/435.1 |
| 2009/0136007 | A1* | 5/2009 | Schimper ........................ | 379/45 |
| 2009/0252303 | A1* | 10/2009 | Agarwal ......... | H04M 1/274566 379/37 |

* cited by examiner

*Primary Examiner* — Khaled Kassim
(74) *Attorney, Agent, or Firm* — Myers Bigel Sibley & Sajovec

(57) ABSTRACT

Some embodiments of the present invention provide methods for providing emergency services to Voice over Internet Protocol (VoIP) subscribers. It is determined that a connection cannot be established between a VoIP router and a VoIP service provider network. A mobile terminal associated with the VoIP router is requested to dial the emergency services responsive to the determination that the connection cannot be established. A call is initiated from the mobile terminal to the emergency services responsive to the request. Related systems and computer program products are also provided herein.

14 Claims, 3 Drawing Sheets

US 9,237,037 B2

METHODS, SYSTEMS AND COMPUTER PROGRAM PRODUCTS FOR ENABLING EMERGENCY 911 CALLS IN VOICE OVER INTERNET PROTOCOL (VOIP) SYSTEMS

FIELD OF THE INVENTION

The present invention generally relates to Voice over Internet Protocol (VoIP) systems and, more particularly, to emergency 911 access using VoIP systems and related methods and computer program products.

BACKGROUND OF THE INVENTION

As the demand for use of Voice over Internet Protocol (VoIP) across the public Internet increases, the ability to provide Emergency 911 (E911) calling features has been problematic. With traditional landlines, the landlines are typically statically installed and mapped to a particular physical address. Thus, a subscriber of the landline telephone system could call E911 services and, in most instances, the emergency dispatcher would have access to the physical address of the subscriber and the ability to send the appropriate emergency personnel to that physical address.

However, as many more subscribers are using VoIP technology as a replacement for traditional landline telephones in their homes, the ability for emergency dispatchers to pinpoint the physical address of the subscriber has become more difficult. For example, unlike traditional landline telephone subscribers, VoIP subscribers are not tied to their Internet Service Provider (ISP). Thus, VoIP subscribers can change ISPs often. For example, a subscriber may plug their telephone adapters (TAs) into a totally different ISP network, synchronize to the VoIP gateways through that ISP network and start receiving calls almost immediately. This can make it very difficult to determine the physical location of the subscriber.

Recently, the Federal Communications Commission (FCC) mandated that all VoIP Service Providers provide E911 services. This is currently accomplished by having the VoIP subscriber provide their current physical address when signing up for the service. Using the physical address provided by the subscriber, the Service Provider can statically map the subscriber to an appropriate Public Safety Answering Point (PSAPs). PSAPs are the locally/regionally assigned E911 call centers that can redirect calls or dispatch emergency personnel to the appropriate locations.

A problem with the current system using static mapping of the provided physical address is the ability of subscribers to change ISPs and/or locations without informing the service provider and still have a working VoIP telephone. In other words, subscribers do not necessarily have to remain at their registered addresses. Furthermore, network connectivity may also be a problem with the current system. In particular, VoIP packets are communicated through the public Internet and voice packets are not necessarily given a higher priority over other data traffic. Thus, calls to E911 PSAPs may not be guaranteed to ever reach their destination Finally, the local broadband connectivity to the ISP may be offline, for example, the digital subscriber line (DSL) or cable modem may not be connected to the network.

SUMMARY OF THE INVENTION

Some embodiments of the present invention provide methods for providing emergency services to Voice over Internet Protocol (VoIP) subscribers. It is determined that a connection cannot be established between a VoIP router and a VoIP service provider network. A mobile terminal associated with the VoIP router is requested to dial the emergency services responsive to the determination that the connection cannot be established. A call is initiated from the mobile terminal to the emergency services responsive to the request.

In further embodiments of the present invention, the VoIP router may be queried for presence of a mobile terminal. It may be determined if the mobile terminal is powered on if it is determined that a mobile terminal is present. The mobile terminal may be powered on if it is determined that the mobile terminal is not powered on.

In still further embodiments of the present invention, the request to dial the emergency services may be made over a universal serial bus (USB) connection between the VoIP router and the mobile terminal. In certain embodiments of the present invention, the mobile terminal may not have a current service contract.

In some embodiments of the present invention, a call may be initiated from the mobile terminal to a Public Safety Answering Point (PSAP) through a wireless network. The call may be redirected or emergency services may be dispatched to a location of the VoIP subscriber. The PSAP associated with a cell site in which the mobile terminal is currently located may be looked up prior to initiating the call from the mobile terminal to the PSAP. The current location of the mobile terminal may be determined using a global positioning system (GPS).

Although embodiments of the present invention are discussed herein with respect to method embodiments, related systems and computer program products are also provided.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE FIGURES

Other features of the present invention will be more readily understood from the following detailed description of exemplary embodiments thereof when read in conjunction with the accompanying drawings in which.

DETAILED DESCRIPTION OF EMBODIMENTS OF THE INVENTION

Figure 1:
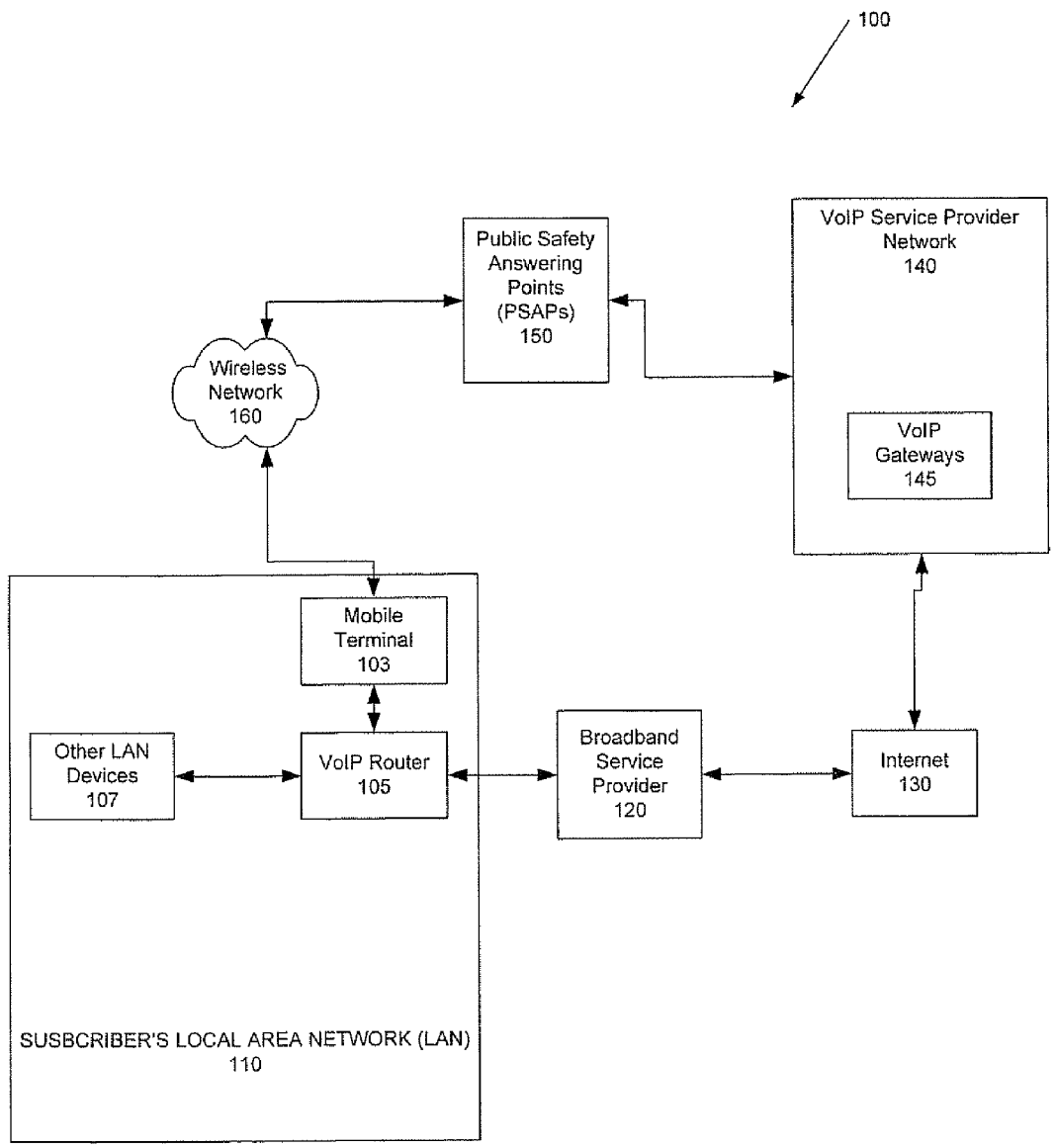
FIG. 1 is a block diagram of a network suitable for use in accordance with some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

The present invention is described below with reference to block diagrams and/or flowchart illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Most telephone companies typically do not sell broadband services without a dedicated landline. However, as the demand for Voice over Internet Protocol (VoIP) increases, this standard practice will most likely be discarded and most subscribers of VoIP may not maintain a traditional telephone line. Furthermore, as cable providers and third party service providers begin to offer VoIP services, problems with the current connection to emergency services (emergency 911 services) may present themselves.

In particular, if the network connectivity is present and the VoIP service is online and working properly, emergency services VoIP calls should typically be routed and answered by the appropriate Public Safety Answering Points (PSAPs). However, if something goes wrong with the network, the network is congested or the a connection to the network cannot be established, problems may occur and people may die as a result of the delay of dispatch of emergency personnel.

Accordingly, as will be discussed further below with respect to FIGS. 1 through 4, some embodiments of the present invention provide methods of contacting emergency services that may bypass the VoIP network. In particular, a mobile terminal may be associated with a VoIP router. For example, VoIP routers according to some embodiments of the present invention may be equipped with a universal serial bus (USB) port and the mobile terminal may be plugged into the USB port. Thus, if the VoIP network experiences problems, the VoIP router cannot connect to the network or the VoIP service fails for any reason, the mobile terminal may be automatically used to initiate the call to emergency services. Therefore, some embodiments of the present invention may provide a backup for emergency services calls as will be discussed further herein with respect to FIGS. 1 through 4.

As used herein, a "mobile terminal" includes devices such as cellular or other communications devices with or without a multi-line display; Personal Communications System (PCS) terminals that may combine a voice and data processing, facsimile and/or data communications capabilities; Personal Digital Assistants (PDA) that can include a radio frequency receiver and a pager, Internet/Intranet access, Web browser, organizer and/or calendar; and/or conventional laptop and/or palmtop computers or other appliances, which include a radio frequency receiver. As used herein, "mobile terminals" may be portable, transportable, or situated and/or configured to operate locally and/or in a distributed fashion at any other location(s) on earth and/or in space.

Referring now to FIG. 1, an exemplary embodiment of a network including a mobile terminal and a VoIP router in accordance with some embodiments of the present invention will be discussed. The network 100 typically includes a local area network (LAN) 110 associated with a subscriber, a broadband service provider network 120 that communicates with the LAN 110, a public Internet 130, a VoIP service provider network 140, a wireless network 160 and public safety answering points (PSAPs) 150. The broadband service provider 120 provides the LAN with access to the public Internet 130, which provides access to VoIP services provided by the VoIP service provider 140. The subscriber associated with the LAN may then access the PSAPs 150 using VoIP services. The VoIP service provider network 140 may include one or more VoIP gateways 145 which may provide access to the PSAPs 150. The wireless network 160 may also provide access from the LAN to the PSAPs 150 as will be discussed further herein.

It will be understood that although a particular configuration for the network is illustrated in FIG. 1, embodiments of the present invention are not limited to this configuration. Any configuration of a network may be used that can provide functionality in accordance with embodiments of the present invention without departing from the scope of the present invention.

Figure 2:
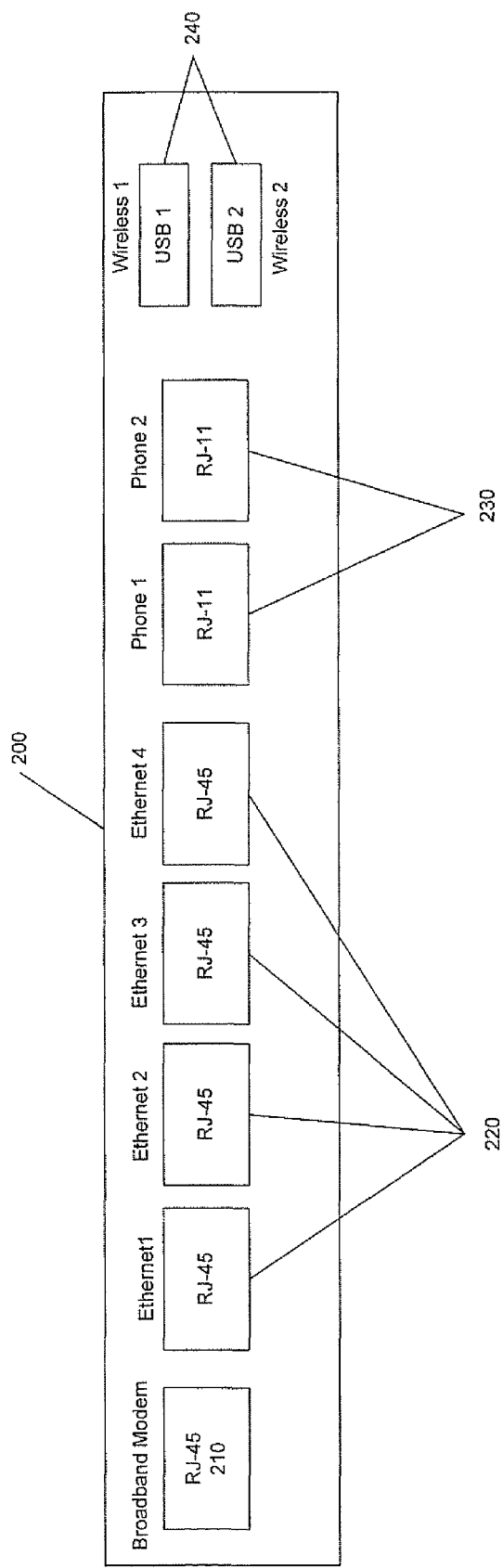
FIG. 2 is a block diagram of Voice over Internet Protocol (VoIP) routers according to some embodiment of the present invention.

In particular, as further illustrated in FIG. 1, the LAN 110 includes a VoIP router 105, which is coupled to a mobile terminal 103 and other household devices. An exemplary VoIP router 105 according to some embodiments of the present invention is illustrated in FIG. 2. Referring to FIG. 2, a VoIP router 200 according to some embodiments of the present invention includes an Ethernet port 210, one or more 10/100 Fast Ethernet ports 220, one or more analog telephone ports 230 and one or more USB ports 240. The Ethernet port 210 may provide wide area network (WAN) connectivity to the broadband service provider (ISP) 120 (FIG. 1). The 10/100 Fast Ethernet ports 220 may provide LAN connectivity that may be used, for example, for a subscriber's personal computers (PCs). The analog telephone ports 230 may be used for landline/traditional telephone service. The one or more Universal Serial Bus (USB) ports 240 may be used to connect the mobile terminal 103 to the VoIP router 105 as will be discussed further herein.

It will be understood that although a particular configuration for the VoIP router is illustrated in FIG. 2, embodiments of the present invention are not limited to this configuration. Any configuration of a VoIP router may be used that can provide access from the router to a mobile terminal without departing from the scope of the present invention.

Referring again to FIG. 1, the other LAN devices 107 coupled to the VoIP router 105 may include, for example, one or more personal computers, landline telephones, and any other network device capable of being coupled to a router. As discussed above, the 10/100 Fast Ethernet ports 220 may provide LAN connectivity that may be used for the subscriber's personal computers (PCs).

According to some embodiments of the present invention, the VoIP subscriber associated with the LAN 110 could install and configure the VoIP router 105 in a conventional manner. As discussed above, the WAN port 210 connects to a broadband modem via an Ethernet cable. The LAN ports 220 connect to individual PCs and/or other Ethernet switches/hubs, the analog telephone ports 230 connect into individual telephones or the existing internal telephone wiring via, for example, CAT3/5 wiring, and the USB wireless ports 240 connect to the GPS-enabled mobile terminal 103.

The mobile terminal 103, which is coupled to the VoIP router 105 through the USB port 240, may provide an alternative connection to emergency services when the VoIP services fail for any number of reasons. Mobile terminals according to some embodiments of the present invention are GPS enabled, have a media interface capable of being converted to a USB cable, have an AC-adapter charger, and a battery capable of retaining a charge. It will be understood that although the mobile terminal is discussed primarily herein as being a backup for the VoIP services, embodiments of the present invention are not limited to this configuration. For example, the mobile terminal may be set as a default for all emergency services calls without departing from the scope of the present invention.

Since the mandate by the FCC to enable all mobile phones to have GPSs manufactured in them to assist with emergency personnel in locating a distressed wireless subscriber, all newly manufactured mobile phones must comply. Furthermore, the FCC has also mandated that all wireless service providers must complete emergency services calls originating from any cell phone regardless of whether the mobile terminal has a current service contract. In other words, if the mobile terminal can sense/receive a particular signal, for example, CDMA or GSM, regardless of the service provider or being currently activated, the FCC mandates that a service provider that receives a 911 call must complete it regardless of the carrier or status of that phone. These two FCC mandates may allow anyone with a working (non-activated) cell phone to make emergency telephone calls to 911.

Exemplary operations of conventional emergency services calls using VoIP services will now be discussed with respect to FIG. 1. The VoIP router 105 may register itself with the service providers' VoIP gateway 145. The VoIP service provider would typically have previously mapped the VoIP subscriber to a specific PSAP 150 based on information provided by the subscriber at sign up. If, for some reason, the VoIP subscriber has not been previously mapped to a specific PSAP 150, it can be done at this time. If someone associated with the subscriber's residence requires emergency services, 911 may be dialed using a VoIP enabled telephone. The VoIP router 105 initiates a VoIP call to the VoIP Gateways 145, the VoIP gateways 145 receive the call request for 911 and proceed to lookup the calling party's telephone number and retrieve the registered PSAP 150 for that subscriber's residence. The VoIP gateways 145 may route that 911 call to the registered PSAP 150. The PSAP 150 receives the call and takes appropriate actions based on the emergency. The subscriber may then terminate the call.

The above described process may work fine or it may encounter problems, such as a congested network or inability to connect to the network, which may result in a person's death due to lack of access to emergency services. Thus, according to some embodiments of the present invention, if the VoIP services experience problems, the emergency services call may be made using the mobile terminal 103 coupled to the VoIP router 105, which will be discussed further herein.

Referring again to FIG. 1, when there is network outage due to broadband connectivity failure or inability to register with the VoIP service provider, i.e. network congestion, the VoIP router 105 cannot typically register itself with its providers' VoIP gateway 145. Thus, when emergency services are dialed the VoIP router 105 may attempt to initiate a VoIP call to the VoIP gateways 145 and the attempt fails. The USB port 240 (FIG. 2) associated with the mobile terminal 103 may be queried to determine the status of the mobile terminal 103. If the mobile terminal 103 is not powered on, the VoIP router 105 may initiate the mobile terminal 103 to power on via the USB cable and correct signaling for the particular type of mobile terminal. If the mobile terminal 103 responds, the VoIP router 105 sends data via the USB cable to the mobile terminal 103 requesting that the mobile terminal 103 dial 911. The mobile terminal 103, regardless of whether it has a current service contract with a service provider, initiates a 911 over a wireless network 160. The wireless provider receives the 911 call from the mobile terminal 103 and proceeds to lookup and retrieve the registered PSAP 150 for that cell site. For example, cell towers may have a built in PSAP 150. The wireless site then routes that 911 call to the registered PSAP. The PSAP receives the call and takes appropriate actions based on the emergency. For example, the PSAP may dispatch emergency services or reroute the call to the appropriate PSAP for emergency services to be dispatched.

In particular, since the wireless 911 caller is connected in close proximity to the receiving cell tower, each tower has a static configuration to route to the designated PSAP. For example, a cell tower in Buckhead, Ga. may route to the Fulton County PSAP and not the Cobb County PSAP due to its physical location. Thus, if a caller is over the county line and the closest cell tower happens to be located in another PSAP's district, the emergency dispatcher can reroute the call to the correct PSAP. Once the call has been completed, the subscriber hangs up the telephone and the call is terminated by the wireless site to the PSAP.

It will be understood that the exemplary operations discussed above are provided for exemplary purposes only and, therefore, embodiments of the present invention should not be limited thereby.

In examples discussed above, emergency services calls are placed across the VoIP router/TA and appropriate action has been defined. There are various reasons why a VoIP call to a PSAP might fail or be misrouted to an incorrect PSAP. VoIP enabled routers according to some embodiments of the present invention can be configured to connect to various brand/make/model mobile terminals and a mobile terminal specific USB interface cable can be used within the manufacturers' specifications. Thus, according to some embodiments of the present invention a dedicated emergency services backup can be provided that may allow emergency personnel to pinpoint VoIP consumers with a GPS-enabled device. It will be understood that although the mobile terminal is discussed primarily herein as being a backup for the VoIP services, embodiments of the present invention are not limited to this configuration. For example, the mobile terminal may be set as a default for all emergency services calls without departing from the scope of the present invention.

Figure 3:
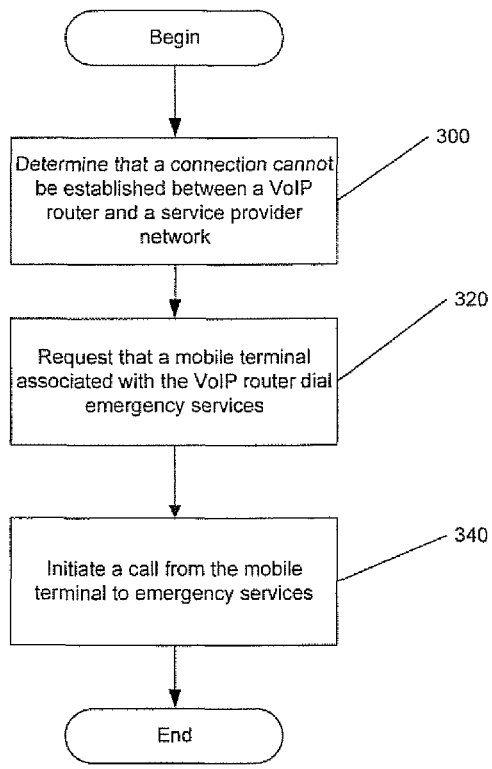
FIGS. 3 through 4 are flowcharts illustrating operations for providing emergency services to VoIP subscribers according to various embodiments of the present invention.

Operations for providing emergency services to VoIP subscribers will now be discussed with respect to the flowchart diagrams of FIGS. 3 and 4 according to various embodiments of the present invention will be discussed. Referring first to FIG. 3, operations begin at block 300 by determining that a connection cannot be established between a VoIP router and a VoIP service provider network. If the mobile terminal has been set as a default for emergency services call, this step may be omitted. As discussed above, there are various reasons as to why VoIP services might fail. A mobile terminal associated with the VoIP router may be requested to dial the emergency services responsive to the determination that the connection cannot be established (block 320). A call may be initiated from the mobile terminal to the emergency services responsive to the request (block 340).

Figure 4:
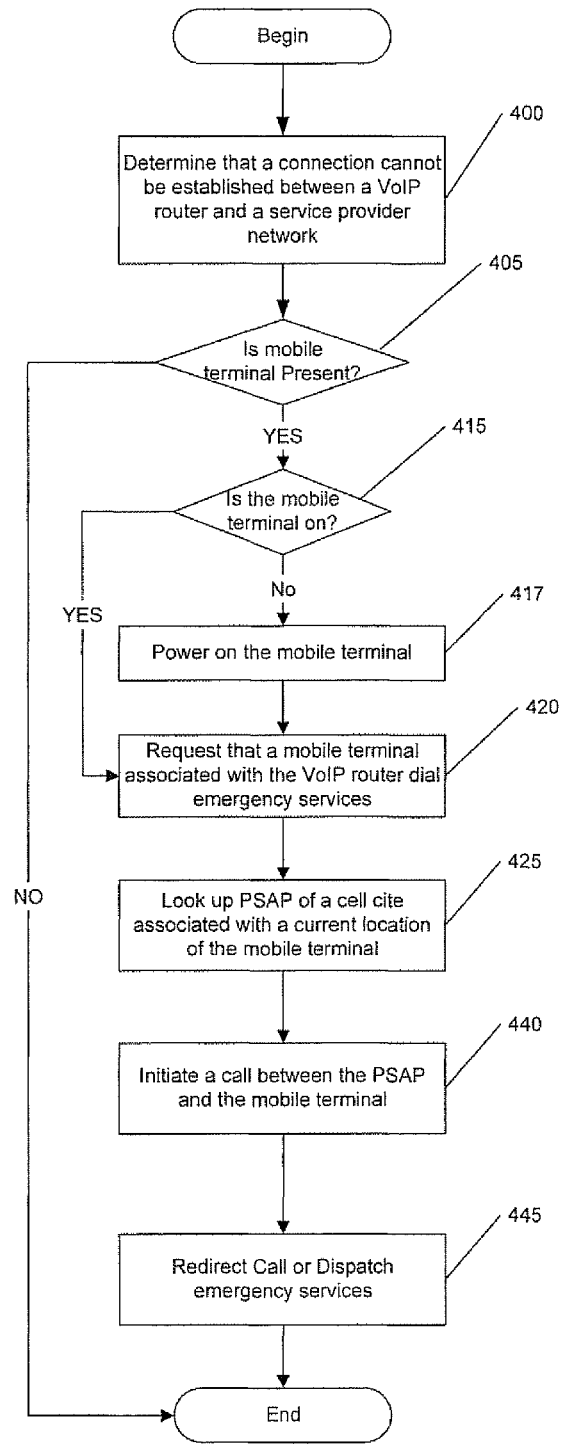

Referring now to FIG. 4, operations according to further embodiments of the present invention will be discussed. Operations begin at block 400 by determining that a connection cannot be established between a VoIP router and a VoIP service provider network. If it is determined that a connection can be established (block 400), operations may continue for connection to emergency services using VoIP services. If, on the other hand, it is determined that a connection cannot be established (block 400), it may be determined if a mobile terminal is present that is associated with the VoIP router (block 405). If a mobile terminal is not present operations may cease. If, on the other hand, it is determined that a mobile terminal is present (block 405), it is determined if the mobile terminal is powered on (block 415). If the mobile terminal is not powered on (block 415), the mobile terminal may be powered on (block 417) and operations may proceed to block 420. If the mobile terminal is powered on, operations proceed to block 420. In some embodiments of the present invention, the mobile terminal may not have a current service contract and still function in accordance with some embodiments of the present invention.

A mobile terminal associated with the VoIP router may be requested to dial the emergency services responsive to the determination that the connection cannot be established (block 420). The request that the mobile terminal associated with the VoIP router dial the emergency services may be made over a universal serial bus (USB) connection between the VoIP router and the mobile terminal.

The appropriate PSAP of a cell site associated with a current location of the mobile terminal may be looked up (block 425). The current location of the mobile terminal may be determined using a global positioning system (OPS). A call may be initiated from the mobile terminal to the emergency services responsive to the request (block 440). The call may be initiated from the mobile terminal to a Public Safety Answering Point (PSAP) through a wireless network. The call may be redirected to an appropriate PSAP or emergency services may be dispatched by the PSAP to a location of the VoIP subscriber (block 445).

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method For providing emergency services to a voice over internet protocol subscriber, comprising:
   Determining that a connection cannot be established between a voice over internet protocol router and a voice over interact protocol service provider network;
   requesting that a mobile terminal physically coupled to the voice over internet protocol router dial the emergency services only responsive to the determining that the connection cannot be established; and
   automatically initiating a call from the mobile terminal physically coupled to the voice over internet protocol router to the emergency services responsive to the requesting that the mobile terminal associated with the voice over internet protocol router dial the emergency services;
   wherein requesting is preceded by querying the VoIP router for presence of a mobile terminal; and
   wherein querying is followed by: determining if the mobile terminal is powered on if it is determined that a mobile terminal is present; and powering on the mobile terminal if it is determined that the mobile terminal is not powered on.

2. The method of claim 1, wherein the requesting that the mobile terminal associated with the voice over internet protocol router dial the emergency services further comprises requesting that the mobile terminal associated with the voice over internet protocol router dial the emergency services over a universal serial bus connection between the voice over internet protocol muter and the mobile terminal.

3. The method of claim 1, wherein the mobile terminal does not have a current service contract.

4. The method of claim 1, wherein the initiating the call from the mobile terminal to the emergency services further comprises initiating the call from the mobile terminal to a public safety answering point through a wireless network.

5. The method of claim 4, wherein the initiating the call from the mobile terminal to the emergency services is followed by dispatching emergency services to a location m the voice over internet protocol subscriber.

6. The method of claim 4, wherein the initiating the call from the mobile terminal to the public safety answering point is preceded by looking up the public safety answering point associated with a cell site in which the mobile terminal is currently located.

7. The method of claim 6, wherein the current location of the mobile terminal is determined using a global positioning system.

8. A system for providing emergency services to a voice over internet protocol subscriber, comprising:
   a mobile terminal that is configured to receive positioning information; and a voice over internet protocol router physically coupled to the mobile terminal and configured to determine that a connection cannot be established between the voice over internet protocol router and a voice over internet protocol service provider network and request that the mobile terminal dial the emergency services only when the connection cannot be established, wherein the mobile terminal is further configured to automatically initiate a call from the mobile terminal to the emergency services responsive to the request that the mobile terminal dial the emergency services;

wherein the voice over internet protocol router further comprises a universal serial bus port configured to couple the voice over internet protocol router to the mobile terminal and wherein the voice over internet protocol router is further configured to query the voice over internet protocol router for presence of the mobile terminal if the connection cannot be established between the voice over internet protocol router and a voice over internet protocol service provider; and wherein the voice over internet protocol router is further configured to: determine if the mobile terminal is powered on if the mobile terminal is present; and power on the mobile terminal if the mobile terminal is not powered on.

9. The system of claim 8, wherein in the mobile terminal is further configured to initiate a call from the mobile terminal to a public safety answering point through a wireless network.

10. The system of claim 9, wherein, the public safety answering point is configured to dispatch emergency services to a location of the voice over internet protocol subscriber.

11. A computer program product for providing emergency services to a voice over internet protocol subscriber, the computer program product comprising:

a non-transitory computer readable storage medium having computer readable program code embodied in the medium, the computer readable program code, when executed by a processor, performing a method comprising:

determining that a connection cannot be established between a voice over internet protocol router and a voice over internet protocol service provider network;

requesting that a mobile terminal physically coupled to the voice over internet protocol-router dial the emergency services only responsive to the determining that the connection cannot be established; and automatically initiating a call from the mobile terminal to the emergency services responsive to the requesting that the mobile terminal physically coupled m the voice over internet protocol router dial the emergency services;

querying the voice over interact protocol router for presence of the mobile terminal; and determining if the mobile terminal is powered on if the mobile terminal is present; and powering on the mobile terminal if the mobile terminal is not powered on.

12. The computer program product of claim 11, wherein the initiating the call from the mobile terminal to the emergency services further comprises initiating the call from the mobile terminal to a public safety answering point through a wireless network.

13. The computer program product of claim 12, further comprising dispatching emergency services to a location of the voice over interact protocol subscriber.

14. The computer program product of claim 12, further comprising looking up the public safety answering point associated with a cell site in which the mobile terminal is currently located.

\* \* \* \* \*

UNITED STATES PATENT AND TRADEMARK OFFICE
CERTIFICATE OF CORRECTION

PATENT NO. : 9,237,037 B2  
APPLICATION NO. : 11/548374  
DATED : January 12, 2016  
INVENTOR(S) : Orin Reams Page 1 of 1

It is certified that error appears in the above-identified patent and that said Letters Patent is hereby corrected as shown below:

In the Claims:
Column 8, Claim 5, Line 53: Please correct "location m the"
to read -- location of the --

Column 10, Claim 11, Line 15: Please correct "coupled m the voice"
to read -- coupled to the voice --

Signed and Sealed this
Twelfth Day of April, 2016

Michelle K. Lee
*Director of the United States Patent and Trademark Office*